C. E. OLIVER.
WHEEL FOR ROAD VEHICLES.
APPLICATION FILED MAY 22, 1916.
1,271,068.
Patented July 2, 1918.
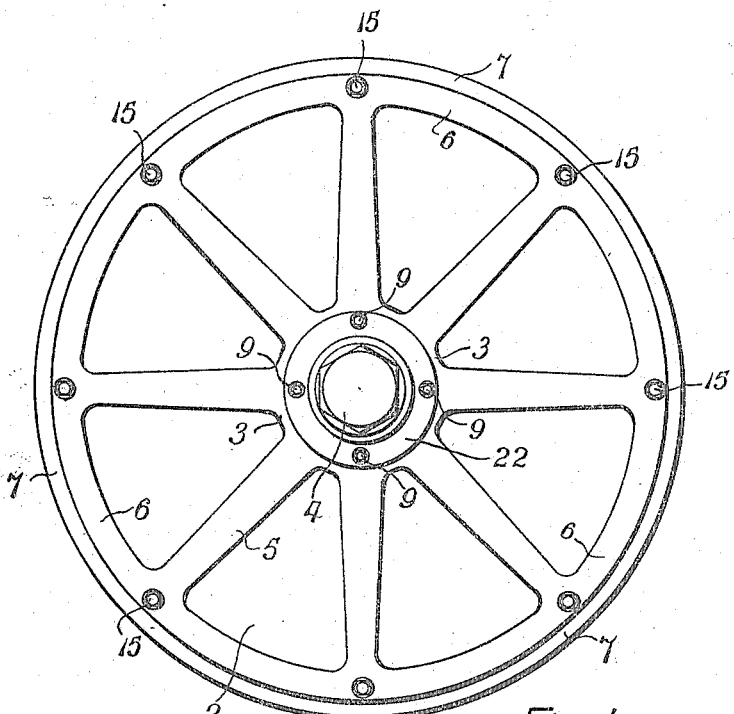
Fig.1.
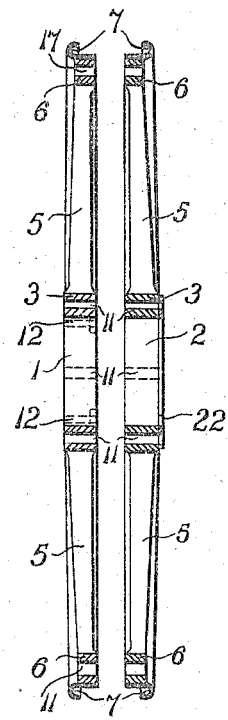
Fig.2.
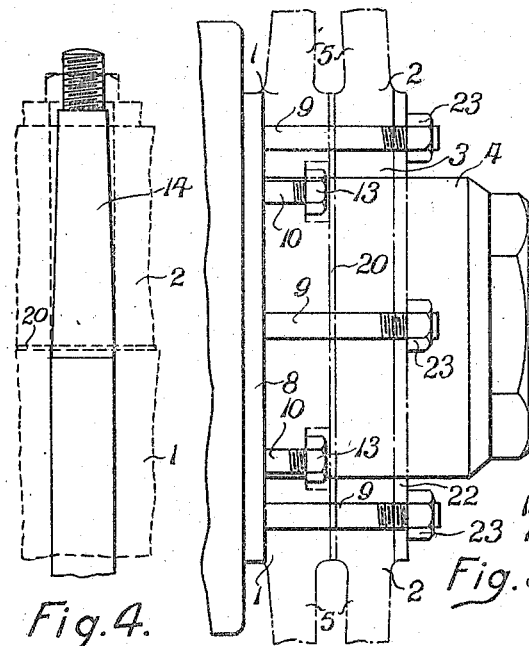
Fig.4. Fig.3.
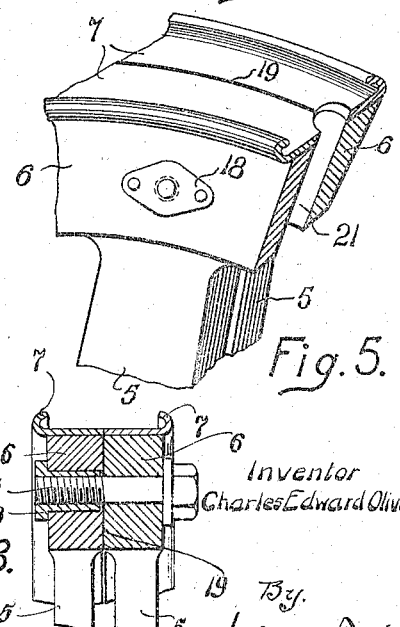
Fig.5.
Fig.6.
Inventor
Charles Edward Oliver
By
Herbert E. Smith
Attorney

UNITED STATES PATENT OFFICE.

CHARLES EDWARD OLIVER, OF LONDON, ENGLAND.

WHEEL FOR ROAD-VEHICLES.

1,271,068.   Specification of Letters Patent.   Patented July 2, 1918.

Application filed May 22, 1916. Serial No. 99,197.

*To all whom it may concern:*

Be it known that I, CHARLES EDWARD OLIVER, a subject of the King of Great Britain, and a resident of London, England, have invented certain new and useful Improvements in Wheels for Road-Vehicles, of which the following is a specification.

This invention relates to improvements in wheels for road vehicles, and has reference to wheels including a tire carrying rim comprising circular and substantially similar parts or disks provided with means whereby the parts can be arranged and secured on the hub. A usual method of constructing such wheels is to secure one of the parts to the hub and rely upon bolts securing the parts together at the felly to keep the wheel rigid. With this construction, however, the tendency of the parts to move relatively has to be restrained solely by the bolts at the felly, and unless very substantial bolts are employed they are liable to become bent and so prevent the ready disassembly of the wheel.

The present invention consists of an improved construction of such wheels, an important feature of which is that the two or more parts of the wheel are secured positively to rotate with the hub as well as being rigidly secured to each other so as to obviate any possibility of relative movement of the parts and to relieve the bolts connecting the two or more wheel parts at the felly from the strain consequent upon the tendency of the two or more parts to move relatively. This involves the provision of a plate rigidly secured to rotate with the hub and provided with a series of short bolts for securing the inner part of the wheel to the hub and a series of long bolts adapted to pass through both or all the wheel parts.

Further features of the invention consist in the provision of packing rings or gaskets between the two or more wheel parts to insure watertight joints and a special arrangement of bushing in one of the wheel parts for receiving the bolts which pass through the felly of the wheel parts.

By means of the foregoing construction great rigidity is secured and the removal of the outer half or parts of the wheel can be readily effected.

The invention will be more clearly understood from the following description in relation to the accompanying drawings wherein is shown a wheel constructed in accordance with my invention; but it will be appreciated that, though I have depicted a wheel having wooden spokes, and so assembled that the spokes of the two halves are coincident, that is to say, lie one behind the other, I do not confine myself to this form of wheel, and that the invention is applicable to wheels carrying spokes of other material, and that the two parts forming the wheel may be so assembled that their respective spokes may be differently arranged in relation to each other.

While I have illustrated the wheel made up of two sections, it will be understood that a greater number of sections may be used if desired, in order to accommodate different widths of tires.

In these drawings:—

Figure 1 is an outside view of the assembled wheel with the tire removed.

Fig. 2 is a cross sectional view of the two halves of the wheel.

Fig. 3 is an enlarged view of the hub assembly showing in dotted lines the position occupied by the wheel when assembled.

Fig. 4 is an enlarged view of a special form of tapered bolt.

Fig. 5 is a perspective view of a portion of the rim and felly.

Fig. 6 is a cross sectional view of the rim taken through one of the binding bolts.

Referring to these drawings and more particularly to Figs. 1 and 2 the numeral 1 designates the inner half of one of the wheels, and the numeral 2 the outer half. Each half comprises, a boss 3 to fit on the hub 4, spokes 5 radiating therefrom and half of a rim 6 and beading 7. The hub 4 is fitted with a circular plate or disk 8 cut away at its center to accommodate the axle or like parts and of such a size as to register with, or exceed, the boss 3 of the inside half 1 of the wheel. This plate or disk 8 which may form part of the drum, and in any case must be rigidly associated with the hub, carries bolts which are alternately long and short, the long bolts are indicated by the numeral 9 and the short by the numeral 10. These bolts 9 and 10 are screw threaded, but at their ends only so that they may accommodate their nuts and yet cause as little friction as possible when it is required that the outer half 2 be moved over them. They are placed in a circle around, and perpendicular to, the outside face of the plate or disk 8 and are at such a distance from the center of said plate or disk 8 that the long and short bolts 9 and 10 register with holes 11 and 12 cut in the bosses 3 of the two halves of the wheel 1 and 2 respectively, the short bolts 10 with the holes 12 of the inside half 1 of said wheel, and the long bolts 9 with the holes 11 which pass through both the halves 1 and 2 of the wheel. As beforementioned the bolt holes in the second half 2 of the wheel may be so placed that the spokes 5 carried by it coincide with the spokes 5 carried by the first half 1. The nuts 13 of the bolts 10 lie in holes countersunk in the half 1 so that the two halves may fit tightly up against one another.

A modified form of long bolt 14 is shown to an enlarged scale in Fig. 4. This bolt is tapered for slightly more of its length than registers with the half 2 of the wheel, with the object of allowing the part 2 to be more easily removed.

To secure rigidity of the structure the rims of the two halves 1 and 2 are preferably formed with a felly 6. This felly carries bolts 15 suitably spaced around it. These bolts 15 are formed in the following manner in order that they may be completely removed or inserted before the half 2 is withdrawn or assembled, as it is quite clear that the fewer the number of bolts which the half 2 has to encounter as it is manipulated in its movement when assembling or dismantling the wheel the more easily can such movement take place. The half of the rim 6 carried by the inner half 1 has its bolt holes 17 provided with an internally screwed metal bushing 18, as shown particularly in Fig. 6, and the bolt 15 is similarly screw threaded over that portion only which coincides with this bush 18. It will be seen that this bolt 15 can be inserted or removed without in any way disturbing either half of the wheel. A leather or other packing or gasket 19 is inserted between the two halves of the rim 6 to provide a close fit for same, and a watertight housing for the tire. A similar leather, or other packing or gasket 20 may be provided between the two halves of the boss 3.

Radial and semi-cylindrical holes 21 are left at suitable places around the rims 6, as shown in Fig. 5 which when the halves come together form cylindrical grooves, or housings, for the valve of the tire, or for such security bolts or the like as it may be considered desirable to use. A plate 22 is preferably used to provide a bearing for the nuts 23 of the bolts 9.

When it is required to remove the tire from the rim it is only necessary to remove the circumferential bolts 15 by operation upon the nuts 16 and remove the nuts 23 from the bolts 9. The part 2 is then easily drawn off from the long bolts 9 and the tire is at once available without the necessity for removing the valve, security bolts or the like, and straining the tire by forcing it over the projecting beading of the rim. On assembling, the tire together with its component parts, inner tube, security bolts or the like, can be placed bodily in position thus obviating the danger of a puncture by an accidental nipping of the inner tube by the security bolts, by the rim of the outer cover, or by the tools such as tire levers or the like.

What I claim and desire to secure by Letters Patent is:—

1. A wheel made up of two sections each comprising a felly, a central open boss and integral spokes connecting the felly and boss, combined with a hub, means securing the inner boss to said hub, means securing the inner and outer bosses to said hub, and means near the periphery of the wheel for securing the two sections together.

2. A wheel made up of two sections each comprising a felly, a central open boss, and spokes connecting the felly and boss, combined with a hub, a series of bolts securing the inner boss to the hub, a series of longer bolts passed through both bosses and secured to the hub, and bolts near the periphery fastening the two sections together.

3. A wheel made up of two sections each comprising a felly, central open boss, and integral spokes, combined with a hub and an attaching plate on the hub, a series of short bolts attaching said plate to the inner boss, a series of longer bolts passed through both bosses and securing the outer boss to the plate, and bolts near the periphery of the wheel securing the two sections together.

4. A vehicle wheel including a tire carrying rim, and comprising a hub plate, a series of short bolts screw threaded at their outer ends and rigid with said plate, a series of longer bolts screw threaded at their outer ends and rigid with said plate, a wheel portion having openings and countersunk recesses to fit over said short bolts and nuts in the recesses on the bolts, a second wheel section having bolt openings and recesses and nuts on the longer bolts located in said recesses, and a gasket interposed between said wheel portion and section.

In testimony whereof I affix my signature.

CHARLES EDWARD OLIVER.